United States Patent [19]

Fyson et al.

[11] Patent Number: 5,437,790
[45] Date of Patent: Aug. 1, 1995

[54] FILTRATION TECHNIQUE

[75] Inventors: John R. Fyson, London; Martyn S. Glover, Watford; David M. Henson, Harrow, all of Great Britain

[73] Assignee: Eastman Kodak Company, Rochester, N.Y.

[21] Appl. No.: 341,452

[22] Filed: Nov. 16, 1994

Related U.S. Application Data

[63] Continuation of Ser. No. 984,577, Aug. 4, 1993, abandoned.

[30] Foreign Application Priority Data

Sep. 7, 1990 [GB] United Kingdom ............... 9019607

[51] Int. Cl.⁶ ..................... C02F 1/72; B01D 37/02
[52] U.S. Cl. ..................... 210/710; 210/721; 210/759; 210/778
[58] Field of Search ............... 210/710, 724, 778, 721, 210/758, 759

[56] References Cited

U.S. PATENT DOCUMENTS

| | | | |
|---|---|---|---|
| 3,767,572 | 10/1973 | Bober et al. | 252/188 |
| 4,149,975 | 4/1979 | Keim et al. | 210/502 |
| 4,201,670 | 5/1980 | Baur | 210/331 |
| 5,069,817 | 12/1991 | Schmid et al. | 210/778 |

FOREIGN PATENT DOCUMENTS

| | | |
|---|---|---|
| 0164225 | 12/1985 | European Pat. Off. . |
| 0265941 | 5/1988 | European Pat. Off. . |
| 545752 | 2/1974 | Switzerland . |
| 625425 | 9/1981 | Switzerland . |
| 9019605 | 3/1992 | United Kingdom . |
| 9019606 | 3/1992 | United Kingdom . |

Primary Examiner—Neil McCarthy
Attorney, Agent, or Firm—J. Lanny Tucker

[57] ABSTRACT

A method for increasing the filtration rate of a precipitate produced from a photographic effluent includes treating the effluent with hydrogen peroxide and an alkaline earth metal salt to form a precipitate and adding to the precipitate a diatomaceous earth filtering aid and then filtering the precipitate.

4 Claims, No Drawings

FILTRATION TECHNIQUE

This application is a continuation of application Ser. No. 07/984,577, filed Aug. 4, 1993, now abandoned.

This invention relates to effluent treatment and in particular to the removal of precipitates in treated and untreated photographic processor effluents by an improved filtration technique.

The overflow from a photographic processor will typically consist of polluting substances such as heavy metals, sequestering agents, substances that have a high oxygen demand and colour developing agents and their derivatives, straight disposal of which contravenes sewer regulations. It is therefore essential that the overflow is converted by chemical or physical means to a liquid which can be poured into the sewer and/or a residual solid which can be removed to a place of safe and legal disposal.

The effluent form photographic processors can be treated to precipitate out potentially polluting compounds as described in co-pending European Application No.91915113.4, of even date herewith. In this process an oxidising agent is added to reduce the chemical oxygen demand of the effluent by converting the reducing sulphur compounds to their oxidised form by destruction of thiosulphate and by precipitation of silver salts, followed by the addition of a base, such as a water soluble salt of an alkaline earth metal, to precipitate out heavy metal ions. These precipitates can be, however, difficult to filter or separate.

Suitable oxidising agents may be inorganic or organic and may include permanganate, perchromate, persulphate, perphosphate, perborate, or percarbonate, benzyl or urea peroxide but conveniently hydrogen peroxide is used, usually 30%, preferably in an amount of 20 to 100ml/l, most preferably 30 to 50 ml/l of effluent.

The addition of materials of high bulk to improve filtration is a technique already known in the art. However this process has hitherto not been applied to assist the precipitation and filtration of effluents that have been treated to precipitate out polluting materials and in particular to treated photographic effluents.

If an inert powder of high bulk is added to the precipitate from a liquid effluent before filtration it has been found that the rate of filtration is improved by preventing the pores in the filter medium from becoming clogged, thus reducing the separation time. Not only is the filtration more efficient in that less precipitate is found in the filtrate but the pressure required to give rapid filtration can be reduced. Similarly addition of such a powder before settling improves the rate at which the solid phase will settle.

The effluent to be treated may, for example, have arisen from any of the photographic processes described in Item 308119, Research Disclosure December 1989, Industrial Opportunities Ltd., Hants., U.K., and especially sections XIX, XX and XXIII thereof.

However the process could be used to speed up the separation and filtration of any effluent treated to precipitate components or their derivatives.

According to the present invention there is provided a method of separation of a precipitate from a treated or untreated photographic processor effluent, comprising the addition of an inert powder of high bulk prior to filtration or settling.

The inert powder may be aluminium hydroxide, wet sawdust or any other medium of high bulk but conveniently a diatomaceous earth, such as kieselguhr, is used, preferably in an amount of between 10 and 100 g/liter of effluent, most preferably between 25 and 35 g/liter.

The invention will now be described with reference to the following Example which does not in any way limit the scope of the invention.

EXAMPLE FILTRATION WITH KIESELGUHR

A model treated photographic processor effluent was made by stirring 30 g calcium powder with 1 liter of water (The use of calcium hydroxide to precipitate out heavy metal ions has been described in the afore-mentioned co-pending U.K. Application).

For the filtration test a 7cm Buchner funnel was fixed into a Buchner flask using an appropriate adaptor. The funnel was fitted with a piece of Whatman No. 41 fast ashless filter paper cut to size. The Buchner flask was connected to a water pump and the water turned on. 100 ml of the model treated effluent was poured into the funnel and the filtration time was measured. A further 100 ml of the treated effluent was poured through the same funnel complete with paper and filtrate. The filtration time was again recorded. This was repeated again with a further 100 ml of the treated effluent.

The entire procedure was repeated after the addition of 30 g/l kieselguhr powder to the model treated effluent. The three times were recorded. A comparison of the results is shown below.

TABLE

| Process | Filtering time (seconds) | |
|---|---|---|
| | No kieselguhr | With kieselguhr |
| 1st 100 ml treated effluent | 22 | 8 |
| 2nd 100 ml treated effluent | 48 | 12 |
| 3rd 100 ml treated effluent | 73 | 17 |

As can be seen from the Table, the effluent treated with kieselguhr filters at least three times more quickly and four times more quickly when there is already a precipitate on the filter paper.

We claim:

1. A method for increasing the filtration rate of a filtered precipitate from a photographic effluent comprising:

treating a photographic effluent with hydrogen peroxide and an alkaline earth metal salt to form a precipitate;

adding to said precipitate an inert powder comprising a diatomaceous earth; and filtering the precipitate.

2. The method as claimed in claim 1 wherein the diatomaceous earth is kieselguhr.

3. A method as claimed in claim 1, wherein said inert powder is added in an amount of from 10 to 100 g/l effluent.

4. A method as claimed in claim 1, wherein said inert powder is added in an amount of from 25 to 35 g/l effluent.

* * * * *